F. J. HOLMES.
ELECTRICAL HEATING DEVICE.
APPLICATION FILED JAN. 4, 1909.
1,027,337.
Patented May 21, 1912.
2 SHEETS—SHEET 1.
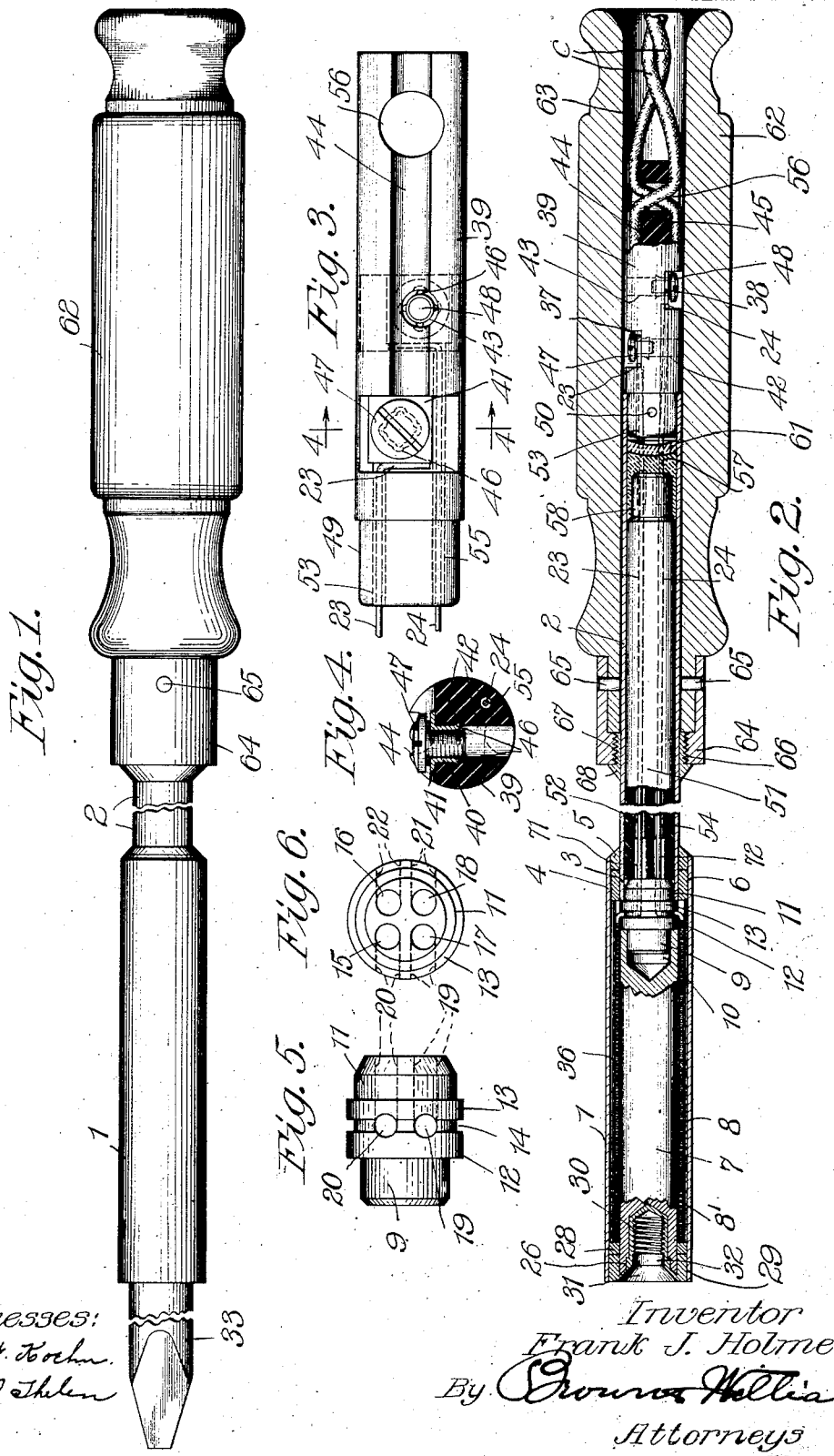
Witnesses:
Fred W. Koehn
Frank J. Thelen
Inventor
Frank J. Holmes
By [signature]
Attorneys F. J. HOLMES.
ELECTRICAL HEATING DEVICE.
APPLICATION FILED JAN. 4, 1909.
1,027,337.
Patented May 21, 1912.
2 SHEETS—SHEET 2.
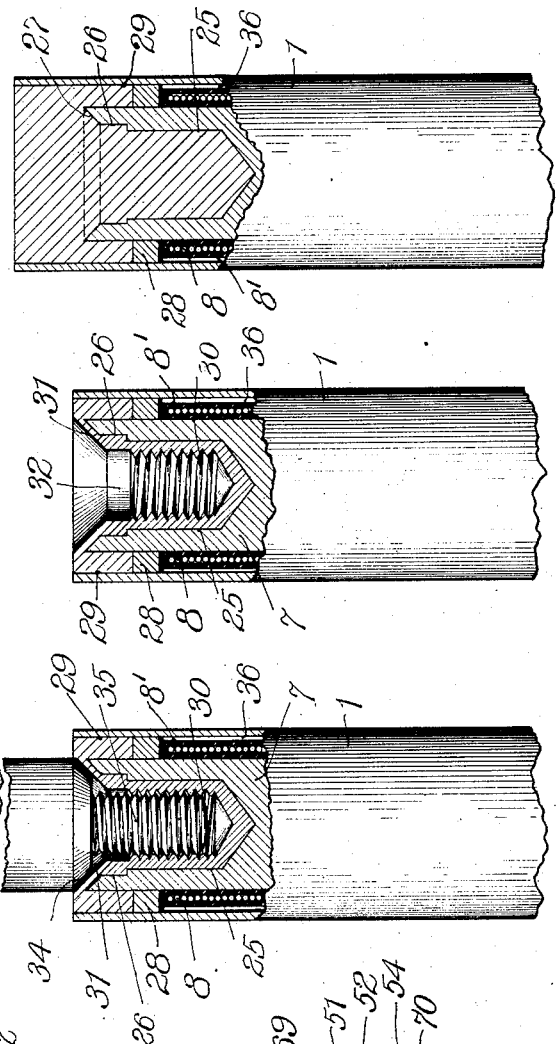
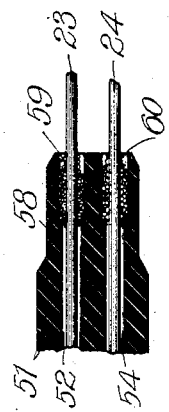
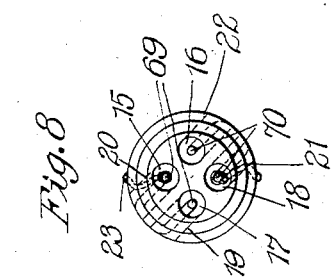
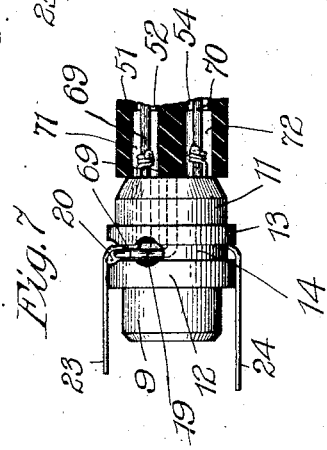
Witnesses:
Inventor
Frank J. Holmes
By
Attorneys

UNITED STATES PATENT OFFICE.

FRANK J. HOLMES, OF CHICAGO, ILLINOIS, ASSIGNOR TO VULCAN ELECTRIC HEATING COMPANY, OF CHICAGO, ILLINOIS, A CORPORATION OF ILLINOIS.

ELECTRICAL HEATING DEVICE.

1,027,337.

Specification of Letters Patent. Patented May 21, 1912.

Application filed January 4, 1909. Serial No. 470,692.

*To all whom it may concern:*

Be it known that I, FRANK J. HOLMES, a citizen of the United States, residing at Chicago, in the county of Cook and State of Illinois, have invented certain new and useful Improvements in Electrical Heating Devices, of which the following is a full, clear, concise, and exact description, reference being had to the accompanying drawings, forming a part of this specification.

My invention relates to electrical heating devices, particularly to such devices for heating soldering tips, branding tips and so on, the invention contemplating novel and improved construction of the various parts, to produce a more durable and more efficient device of this class.

As one feature of my invention, I inclose all the active parts in a sealed, airtight case or frame, this being a very important and desirable requirement, particularly in soldering irons. Frequently the user of a soldering iron or other heating device will plunge the device in water to quickly cool it, so that it can be put away for use and not burn objects on which it is laid. This practice is very detrimental particularly to unsealed electric soldering irons. When such an iron is heated, the air within the casing expands and is partly expelled, and if the iron is then plunged into water the air contracts and causes the water to be sucked in. When current is again passed through the windings, a burn-out is liable to occur. The consequence is that new windings must be very frequently inserted and other repairs frequently made. By having the case airtight, the iron can be plunged in water without moisture getting into the casing and the windings and circuits will be protected, thus greatly prolonging the life of the iron. This feature of my invention also avoids gradual destruction of the winding and insulation by keeping out fumes of the soldering flux and the oxygen and moisture of the air.

My invention comprises a number of other features of construction useful in electric heating devices. These will appear in the following detailed description of an electric soldering iron.

In the drawings accompanying this description, Figure 1 is an elevation view of the soldering iron; Fig. 2 is a diametrical sectional view of the iron with the tip removed; Fig. 3 is an enlarged view of the terminal member; Fig. 4 is a sectional view taken on line 4—4, of Fig. 3; Fig. 5 is an enlarged elevation view of a spool insulator which I employ; Fig. 6 is an end view of said insulator; Fig. 7 is an elevation view of the spool insulator showing the preferable arrangement of terminal conductors therein; Fig. 8 is an end view from the left of Fig. 7; Fig. 9 is an enlarged sectional view of the end section of the insulating sleeve which protects the conductors between the insulating spool and the terminal member; Fig. 10 is an enlarged view of the tip end of the soldering iron, showing the manner of sealing this end; Fig. 11 is an enlarged view of the tip end after sealing and after the threaded socket has been cut out for receiving the tip; and Fig. 12 shows the same arrangement as Fig. 11, with the soldering tip inserted.

The metallic frame or inclosing shell for the iron comprises the tubular section 1, which forms the cylindrical wall for the heat producing member, and the tubular section 2. Depending upon the size and capacity of the iron, these tubular sections may be of the same diameter, or the section 1 may be of larger diameter, as shown. The end 3 of the extension 2 extends a short distance into end 4 of section 1, these ends being securely brazed together. A ring 5, preferably of steel, is slipped over the end 3 preferably with a tight fit, and the end 4 then slipped over the ring also with a tight fit, so that the tubular parts will hold themselves relatively rigid. Instead of inserting a ring, I may spin the tube down to fit in the end of the core. An annular cup 6 is thereby formed, which is filled with brazing alloy and suitable flux applied. When heated, the alloy firmly brazes together the ends 3 and 4, and the collar 5 is also securely brazed to these ends, thus forming an absolutely airtight joint at this point.

The heating member for the iron comprises the core 7, preferably of copper, surrounded by the heat producing winding 8. This winding is of a suitable number of turns, and is preferably insulated from the core by mica, mica 8' being also wound about the outside of the winding, so that the winding is protected from adjacent metallic parts, this outer sheath 8' of mica serving also as a means for confining the heat to the core. This core is wound before insertion in its casing 1. To take care of the terminals of the winding, a spool insulator of lava or other suitable insulating material is applied to the inner end of the core. This spool is plainly shown in Figs. 5, 6, 7 and 8, it having the reduced end 9 for fitting tightly into the pocket 10 drilled in the end of the core. The other end 11 of the spool has a slightly smaller diameter than the interior of tubular section 2. Between the ends of the spool are two annular ridges 12 and 13 forming between them the channel 14. There are four holes or passageways, 15, 16, 17 and 18, through the end 11 parallel with the axis, these holes terminating in the plane of the channel 14, and to meet these passageways there are other passageways 19, 20, 21 and 22 in the plane of the channel 14. The coil terminals 23 and 24 pass downwardly through two of the openings in channel 14, and thence through two of the openings in end 11, from which the terminals extend. The other end of the core is drilled to form the pocket 25, which has the end section 26 of slightly larger diameter, and the beveled inner edge 27. After the core is wound and the terminals inserted through the spool insulator, it is slipped into the section 1 with the terminals extending into and through the section 2, the end 11 of the insulator spool engaging in the end 3 of the tubular section 2. The tip end of the tubular section is now sealed.
For this purpose a ring 28, preferably of steel, is inserted between the end of section 1 and the end of the core preferably with a tight fit. This ring could also be slipped on the core before the core is inserted in the section 1. In the first place, this ring together with the end 11 of the spool which engages in the end of tubular section 2, supports the core structure in central position within the tubular section 1. In the second place, the ring 28 forms the bottom for the annular cup 29 formed between the tip ends of the core and section 1. The tip end of section 1 is primarily longer, and when the core is inserted, projects quite a distance beyond the core end. In the annular cup 29 and in the pocket 25 brazing alloy is then filled and flux material applied. When this tip end is heated, the ring 28 and the tip ends of the core and the casing 1 will be securely brazed together to form an absolutely airtight joint, thus hermetically sealing this end of the core chamber. After brazing, the tip end is machined, the final arrangement being that shown in Fig. 11.
In the first place, the extra end of the casing 1 is cut away and then the material in pocket 25 is drilled into and provided with threads 30, whose diameter is less than the original diameter of the pocket. The entrance edge 31 is cut to a taper, and a small section 32 is left unthreaded and of larger diameter than the threads at their bases. In Fig. 12, the tip 33 is shown applied to the finished tip end of the frame. The lower edge 34 of the body part of the soldering tip is tapered to fit the taper 31, and a threaded extension 35 engages threads 30. The diameter of the threads on extensions 35 is less than that of threads 30. The end 35 therefore threads quite loosely into the threaded pocket. When the tip is screwed in, the tapering surfaces 34 and 31 come into snug engagement and the tip is thus rigidly held in place. This snug joint prevents the entrance of acids or other foreign corrosive material to the threads. If any foreign substances should get by the tapered surfaces, it would lodge in the chamber between the threads 30 and the base of the soldering tip, this chamber being formed by the section 32 and the space between part of the taper end 31 and the base of the soldering tip. The beveled edge of the tip engages only the outer part of the beveled surface 31. The looseness of the threads will prevent the foreign substances from having any binding effect, and unequal expansions will also be taken care of by the loose thread arrangement. The result is that the soldering tip can always be readily removed, while at the same time it is held rigidly to the frame. In other irons with which I am familiar, the corrosive substances which leak in between the soldering tip and the supporting frame will bind the tip to the frame, so that its removal is accomplished with difficulty.

The dimensions of the core windings and insulation are such that when the core structure is slipped into the casing section, there will be an annular air chamber 36 between the core structure and casing 1. This air chamber serves as an insulating medium to prevent the heat from the windings from radiating to the frame 1 and thus becoming dissipated and lost, the generated heat being concentrated and confined to the core, which is of copper, the heat flowing to the soldering tip which is in intimate contact with the core end and which is also of high heat conductive material.

The coil lead wires which extend through the tubular section 2 terminate in connectors 37 and 38. These connectors are supported on a cylindrical terminal block 39 of fiber, rubber, or other suitable insulating material best shown in Figs. 3 and 4. Each of these connectors before application comprises a tubular part 40 having the flange 41. In assembling, the connectors are slipped into one end of the openings 42 and 43 extending from the bases of slots or channels 44 and 45, and a spreading tool is then applied from the other end of the openings, and the ends 46 spread outwardly to secure the parts in place. The connectors are then tapped for receiving the binding screws 47 and 48. The terminal block has a reduced end 49 for fitting into the end of tubular section 2, a pin 50, serving to hold the terminal member in place. Before the terminal block is inserted, however, an insulating and protecting sleeve 51 is slipped over the lead wires and into the section 2. This sleeve may be applied over the wires before the core structure is applied in the section 1. Lead wire extends through passageway 52 in sleeve 51, and then through passageway 53 in the terminal block, its end being soldered to the edge of connector 37, as best shown in Fig. 3. Lead wire 24 likewise extends through passageway 54 in sleeve 51 and through opening 55 in the terminal block, its end being soldered to the contact member 38, as shown in Fig. 3. The conductors $c$ for connecting the winding with a source of electricity, are laid in the channels 44 and 45 of the terminal block, the ends of the conductors being clamped to the connectors 37 and 38 by the screws 47 and 48, respectively. At the outer end of the terminal block is a transverse hole 56 through which the conductors $c$ pass and cross. this forming a means for preventing strain on the conductors from being communicated to the terminal members.

In order to make the winding chamber air and water tight, the terminal end of tubular part 2 is sealed. This sealing may be accomplished by means of wax 57, or other insulating compound, which is placed into the end of section 2 and about the end 58 of sleeve 51, which is preferably of reduced diameter. A preferable procedure for sealing this end is as follows, and is illustrated partly in Fig. 9. The ends of the passageways through the sleeve 51 are of enlarged diameter to form pockets 59 and 60. About the lead wires a material such as asbestos is packed into the pockets 59, 60, and also around the sleeve end 58. The melted wax is then poured in and flows into the pockets and around the sleeve end and fills the space between the sleeve end and terminal block, as shown at 57. Two kinds of wax or compound may be employed. The wax 57 has a high melting point, and its chief characteristic is hardness, to offer mechanical protection. Another layer of wax 61 is poured in, having a lower temperature co-efficient and of an adhesive and clinging character, so that as the temperature varies, and expansion and contraction occur, the wax 61 will follow and maintain the sealed conditions.

Before applying the wax, I preferably heat the iron to the greatest temperature which it is apt to reach in service, and this heating may be accomplished by attaching the iron to an electrical circuit. As the iron is heated, any moisture which may be within the casing is driven out and the greater part of the air is also driven out. The wax 57 is then poured in, or placed in solid and melted into place by the heat of the iron. The iron is then allowed to cool. Upon cooling, the air tends to rush back into the iron to replace that driven out, and the wax therefore is pneumatically pressed firmly into place and particularly in pockets 59 and 60 and in the space about the sleeve end 58. The wax having been put in under these conditions will therefore never be blown out of place owing to the expansion of air within the casing parts.

After the wax is applied, the terminal block is secured to the end of section 2 and the winding leads soldered to the connectors 37 and 38, as has already been explained. Any suitable form of handle may be provided for the metallic frame. As shown, I have provided a cylindrical handle 62, which has a center bore 63 preferably of slightly larger diameter than the tube 2 over which the handle is slipped, in order to allow for expansion and contraction. A brass collar 64 is secured about the front end of the sleeve by pins 65, and the end of the collar has interior threads 66 for engaging the threaded sleeve 67, which is securely brazed to the tube part 2. This sleeve part terminates in a head or stop flange 68 for receiving the end of the collar 64. The conductors $c$ extend through and from the rear end of the handle for connection in any suitable manner with a source of current.

As shown in Fig. 2, the leads of the heat-producing winding continue through the sleeve 51. The wire of these windings, however, is usually of small caliber, and might readily break during the assembling and sealing process, and would also generate heat when it is not required. It is therefore preferable to have heavier leads connecting with the connectors and with the winding leads where they emerge from the insulating spool. Figs. 7 and 8 show such an arrangement. The special leads 69 and 70 may be of a larger wire and of lower resistance than the wire on the core. The end of lead 69 is anchored to the insulating spool by passing in through opening 15 and out through passageway 20, then along the channel 14 and through passageways 19 and 17. Lead wire 23 of the winding is then passed through passageways 20 and 15, and is coiled about and brazed to lead 69. In a similar manner, lead 24 passes through passageways 18 and 21; channel 14 and passageways 22 and 16, terminal 24 passing through passageways 21 and 18 and is coiled about and brazed to lead 70. When the sleeve 51 is now applied, the coiled ends of the terminals 23 and 24 will be received by the pockets 71 and 72 formed by the enlarged inner ends of the passageways through the sleeve. Any other form of loop or anchorage means could be provided, the main object being to securely anchor the ends of the leads so as to prevent any strains on the winding wires.

The soldering tip for an iron of this construction should be of material which has high heat conductivity, or should have some element which possesses high heat conductivity. Other tips, such as branding or leather embossing tips, could be applied to the heating device, to be heated, and these may be of any construction to cause the heat to be conductively led to the place where the heat is required.

There are many changes in detail construction and arrangement which could be made without departing from my invention. I do not, therefore, limit myself to the precise arrangement which I have shown. I think it is broadly new with me to produce a heating device of the class described, in which the active parts are sealed, this enabling the heating device to be subjected to all the uses and abuses in the various trades in which it is used.

I desire to protect the following claims by United States Letters Patent:

1. In a heating device of the class described, the combination of heat producing means, a highly conductive member associated with the heat producing means, a tip or heat applying member for receiving the heat from the conductive member, a threaded opening in said conductive member, an extension from the tip or heat applying member threaded to loosely fit the threads in the conductive member, and a tapered seat on the conductive member, said tip or heat applying member having a tapered edge for engaging the seat when the tip is screwed to the conductive member.

2. In a device of the class described, the combination of a copper core, an electrical heat producing winding surrounding said core, a threaded pocket in one end of said core, a tip having a threaded extension of less diameter than said threaded pocket for engaging with the threads of said pocket to secure the tip to the core, and a tapered seat at the edge of the pocket, said tip having a tapered edge for engaging said seat when the threaded extension is screwed into the pocket.

3. In a heating device of the class described, the combination of a tubular inclosing frame or shell forming a chamber at one end, a core in said chamber, a heat producing winding surrounding said core, a terminal member engaging the other end of said shell, conductors connecting the winding with said terminal member, said conductors passing through the shell and being insulated therefrom, means at the end of the core whereby a tip or heat applying member may be secured to the core to conductively receive heat therefrom, means for connecting the end of the core and shell together to seal said end of the shell, and sealing means at the other end of the shell, said shell being thereby hermetically sealed.

4. In a device of the class described, the combination of a metallic inclosing frame or shell, a core of highly conductive material in one end of said shell, a heat producing winding surrounding said core, a threaded opening in the end of said core for receiving the threaded end of a tip or heat applying member, a terminal member at the other end of the shell, conductors passing through the shell and connecting the winding terminals with the terminal member, the end of the conductive core and the metallic shell being brazed together to hermetically seal this end of the shell, and sealing wax applied to seal the other end of the shell.

5. In a heating device of the class described, the combination of a core of good heat conductive material, a heat producing winding surrounding said core, a metallic inclosing shell about said core and winding, a pocket in the end of said core, sealing material for connecting together the ends of the core and shell to hermetically seal said end of the chamber, the sealing material extending into said pocket and having a threaded opening for receiving the threaded extension of a tip or heat applying member, the terminals of said winding extending from the other end of the chamber, means for connecting said conductors with a source of electricity, and means for sealing the terminal end of said chamber.

6. In a heating device of the class described, the combination of a tubular metallic shell forming a chamber, a tubular extension from said shell of less diameter than said shell, a core in said tubular shell, a winding surrounding said core, a spacing ring between one end of the core and said shell, an insulating spool engaging at one end in the other end of said core and at its other end engaging in the tubular extension, said spacing ring and spool serving to hold the core concentrically within the shell, openings through the spool for accommodating the terminals of the winding, and a terminal member at the end of the tubular extension connected with the winding terminals and adapted for connection with an external source of electricity.

7. In a heating device of the class described, the combination of a tubular metallic inclosing shell forming a chamber, a tubular extension from said shell of less diameter, a core in said shell formed of good heat conductive material, means whereby a tip or heat applying member may be secured to the end of the core in intimate contact therewith to receive the heat therefrom, a heat producing winding surrounding the core, a spool engaging with the other end of the core and extending into the tubular extension, and passageways through said member for accommodating the winding terminals, said terminals extending through the tubular extension to be connected with an external source of electricity.

8. In a heating device of the class described, the combination of a tubular shell forming a chamber, a core in said shell of good heat conductive material, a heat producing winding in said shell surrounding the core, means at the outer end of said core whereby a tip or heat applying member may be secured to the core to be in intimate contact therewith, a tubular extension from said shell, an insulating spool secured in the other end of the core and extending into the tubular extension, passageways through said spool for accommodating the winding terminals, a terminal member at the end of said tubular extension, and leads extending from said terminal member through the tubular extension and anchored to the spool, the winding terminals after passage through the spool openings being electrically secured to the leads.

9. In a heating device of the class described, the combination of heat producing means, a highly conductive member associated with the heat producing means, a tip or heat applying member for receiving the heat from the conductive member, a threaded recess in the heat conducting member, and threads on said tip for fitting loosely in said threaded recess, there being a beveled bearing surface between the tip and said conductive member.

10. In a heating device of the class described, the combination of a tubular inclosing shell forming a chamber, a core in said chamber, a heat producing winding surrounding said core, a terminal head engaging one end of said shell, conductors connecting the winding with said terminal head, means at the other end of the core for receiving the tip, and means for connecting the latter end of said core and the shell together to seal the end of the shell, and sealing means at the other end of the shell, said shell being thereby hermetically sealed.

11. In a heating device of the class described, the combination of an inclosing shell, a tubular extension from said shell of less diameter, a core of heat conductive material in said shell, means at the end of said core for receiving a tip, a heat producing winding surrounding the core, and a spool engaging the other end of the core and extending into the tubular extension, the winding terminals passing through said spool.

12. In a heating device of the class described, the combination of a heat producing means, a highly conductive member associated with the heat producing means, and a tip or heat applying member for receiving the heat from the conductive member, there being a threaded recess in the conducting member and threads on said tip for fitting loosely in said threaded recess and there being an oblique jamming surface between the tip and said conductive member.

In witness whereof, I hereunto subscribe my name this 29th day of December 1908.

FRANK J. HOLMES.

Witnesses:
CHARLES J. SCHMIDT,
FRANK J. THELEN.